May 24, 1949.　　　　　G. E. DATH　　　　　2,471,061
FRICTION SHOCK ABSORBING MECHANISM
Filed March 1, 1947
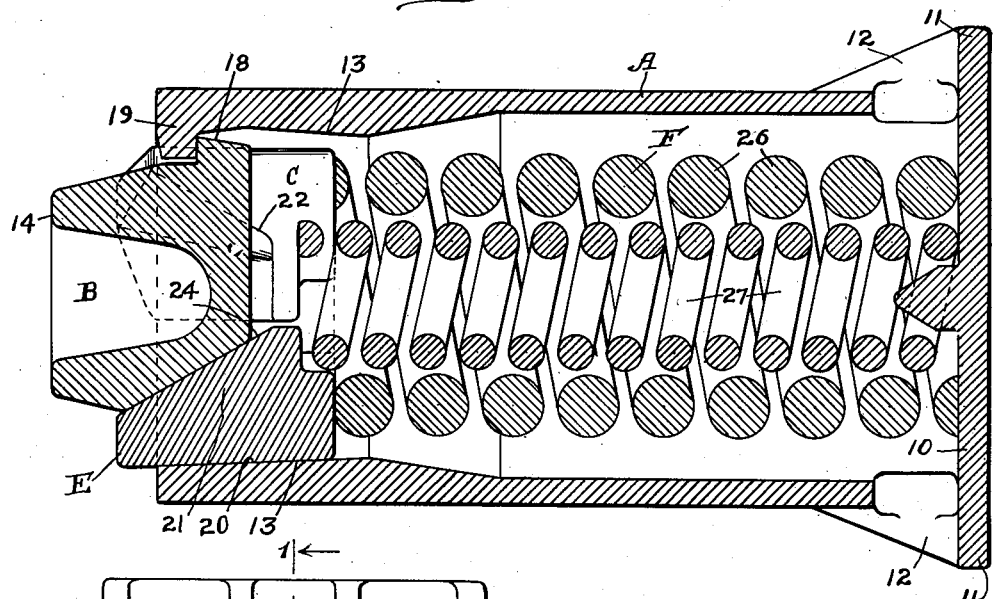
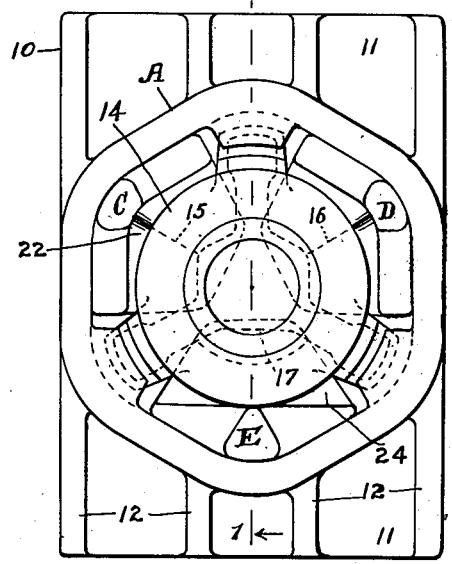
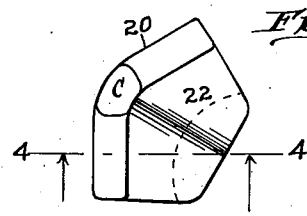
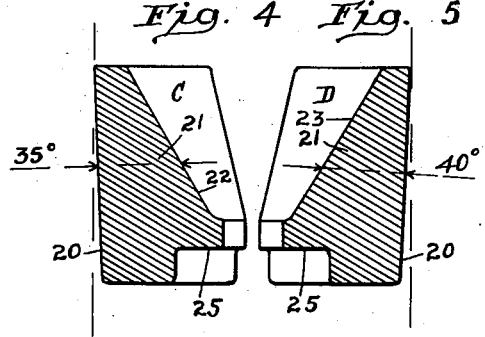
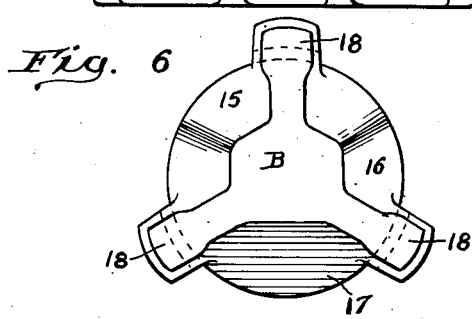
Inventor:
George E. Dath.
By Henry Fuchs.
Atty.

Patented May 24, 1949

2,471,061

UNITED STATES PATENT OFFICE 2,471,061

FRICTION SHOCK ABSORBING MECHANISM

George E. Dath, Mokena, Ill., assignor to W. H. Miner, Inc., Chicago, Ill., a corporation of Delaware Application March 1, 1947, Serial No. 731,857

1 Claim. (Cl. 213—32)

This invention relates to improvements in friction shock absorbing mechanisms.

The main object of the invention is to provide in a friction shock absorbing mechanism of the type having a plurality of friction shoes slidingly engaged within a friction casing, and a wedge block having wedging engagement with the shoes, wherein the shoes and casing have interengaging friction surfaces of V-shaped guide and groove formation, an arrangement which compensates for unavoidable inaccuracies in manufacture and assures proper engagement between the wedge faces of the wedge and shoes and between the friction surfaces of the shoes and casing.

Other objects of the invention will more clearly appear from the description and claim hereinafter following.

In the accompanying drawing forming a part of this specification, Figure 1 is a longitudinal sectional view of a friction shock absorbing mechanism embodying my improvements, corresponding substantially to the line 1—1 of Figure 2. Figure 2 is a front end elevational view of Figure 1. Figure 3 is a front end view of one of the friction shoes of my improved mechanism. Figure 4 is a transverse sectional view, corresponding substantially to the line 4—4 of Figure 3. Figure 5 is a view, similar to Figure 4, showing another shoe of my improved mechanism. Figure 6 is an inner end view of the wedge block of my improved mechanism, looking from right to left in Figure 1.

As shown in the drawing, my improved friction shock absorbing mechanism comprises broadly a combined friction shell and spring cage in the form of a casing A, a wedge block B, three friction shoes C, D, and E in wedging engagement with the wedge block B, and a main spring resistance F.

The casing A, which forms the combined friction shell and spring cage, is of substantially hexagonal, transverse cross section, having the friction shell section thereof formed at the forward end and the spring cage section at the rear end. The casing A is closed at its rear end by a transverse wall 10, which is extended laterally outwardly, thereby providing flanges 11—11 which are adapted to cooperate with the usual rear stop lugs of the railway draft rigging in the manner of the usual rear follower. The flanges 11—11 are preferably reenforced by webs 12—12 formed integral with the walls of the casing A and said flanges. The friction shell section of the casing A presents three interior, lengthwise extending friction surfaces 13—13—13 of V-shaped, transverse cross section, each friction surface being formed by two adjacent walls of the hexagonal casing. The three friction surfaces 13—13—13 converge inwardly of the mechanism, the friction shell thus presenting an inwardly tapered formation.

The wedge B is in the form of a block having a transverse outer end face 14 adapted to bear on the usual front follower of the railway draft rigging. At its inner end, the wedge block B has three inwardly converging wedge faces 15, 16, and 17 arranged symmetrically about the longitudinal central axis of the mechanism. The wedge faces 15 and 16 are of V-shaped, transverse section and the wedge face 17 is substantially flat. The three wedge faces 15, 16, and 17 are preferably of different angularity, the face 15 being shown to have an angularity of 35 degrees, the face 16 an angularity of 40 degrees, and the face 17 an angularity of 30 degrees.

The wedge B is further provided with three laterally outwardly projecting retaining lugs 18—18—18, which engage with three inturned retaining lugs 19—19—19 at the open front end of the casing to limit outward movement of the wedge block B. As shown most clearly in Figure 6, the lugs 18—18—18 of the block B extend radially and are alternated with the wedge faces of said block.

The three friction shoes C, D, and E are of similar design, except as hereinafter pointed out. Each shoe is provided with an outer friction surface 20 of V-shaped, transverse cross section, extending lengthwise of the shoe and engaging the corresponding V-shaped friction surface 13 of the casing. On the inner side, each shoe has a lateral enlargement 21, provided with a wedge face, correspondingly inclined to, and cooperating with, one of the wedge faces of the wedge block B, the wedge faces of the three shoes C, D, and E being respectively indicated by 22, 23, and 24, the wedge faces 22 and 23 being of V-shaped, transverse section, and respectively engaging the V-shaped wedge faces 15 and 16 of the wedge block, and the face 24 being substantially flat and engaging the flat face 17 of said wedge block.

Each shoe has an inset shoulder 25 at the inner end of the enlargement 21 thereof, forming a seat member for the inner coil of the main spring resistance, as hereinafter pointed out.

The main spring resistance F comprises a relatively heavy outer coil 26 and a lighter inner coil 27, interposed between the rear end of the casing A and the inner ends of the shoes C, D, and E, the rear ends of both springs bearing directly on the wall 10 of the casing, and the front ends of the springs 26 and 27 bearing, respectively, on the inner ends of the shoes and the shoulders 25—25—25 of said shoes.

When employed as a shock absorber for railway cars, my improved friction shock absorbing mechanism is compressed in both buff and draft in a well-known manner, the wedge being moved inwardly of the casing, wedging the spring resisted shoes apart and forcing the same to slide inwardly of the casing along the friction surfaces of the same, thus providing the required high frictional resistance to absorb the shocks received in service. When the actuating force is reduced, the expansive action of the spring resistance means forces the shoes outwardly, carrying the wedge therewith, outward movement of the wedge and shoes being positively limited by engagement of the stop lugs 18 of the wedge with the lugs 19 of the casing.

During compression and release of the mechanism, proper seating of the V-shaped friction surfaces of the shoes on the cooperating V-shaped friction surfaces of the casing, and of the wedge faces of the wedge block on the wedge faces of the shoes, is assured regardless of slight variations in the casing, shoes, and wedge which may occur and are unavoidable in standard manufacturing practices, the provision of cooperating flat wedge faces on the wedge and one of the shoes permitting relative lateral displacement of the wedge and shoe with respect to each other to a sufficient extent to allow the V-shaped wedge faces of the wedge and the two remaining shoes to be properly seated on each other and the V-shaped friction surfaces of all three shoes to be seated correctly on the V-shaped friction surfaces of the casing.

I claim:

In a friction shock absorbing mechanism, the combination with a friction casing having three lengthwise extending, interior friction surfaces of V-shaped, transverse cross section arranged symmetrically about the central longitudinal axis of the mechanism; of a friction clutch slidingly telescoped within the casing, said clutch including a central wedge block and three friction shoes arranged symmetrically about said block, said shoes having V-shaped friction surfaces engaging the V-shaped friction surfaces of the casing, said block and one of said shoes having wedging engagement with each other on substantially flat wedge faces, and said wedge and two remaining shoes having wedging engagement with each other on cooperating wedge faces of V-shaped, transverse cross section; and spring means yieldingly opposing inward movement of said clutch.

GEORGE E. DATH.

REFERENCES CITED

The following references are of record in the file of this patent:

UNITED STATES PATENTS

| Number | Name | Date |
|---|---|---|
| 1,780,358 | Miner | Nov. 4, 1930 |
| 2,271,080 | Kinne et al. | Jan. 27, 1942 |